Nov. 12, 1957     H. J. YAGGI     2,812,848
EXTENSIBLE CONVEYOR
Original Filed May 5, 1953     2 Sheets-Sheet 1
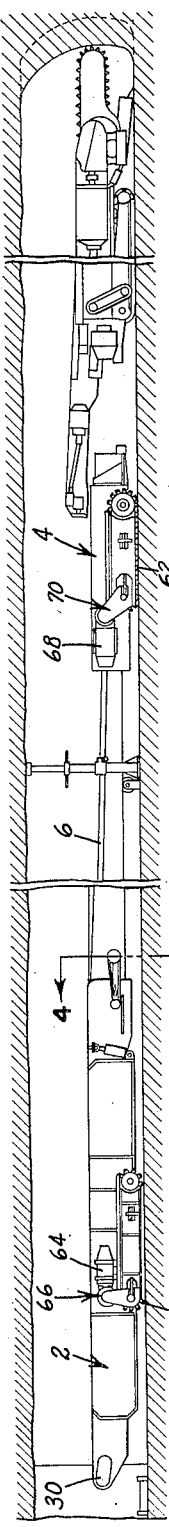
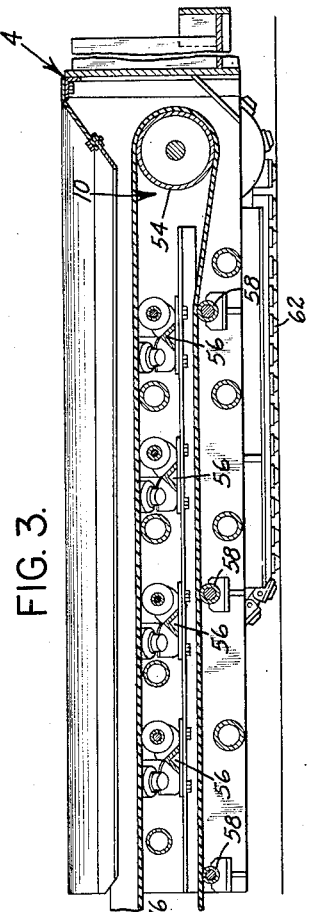
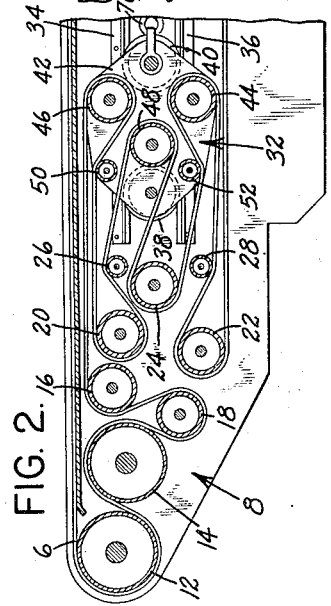
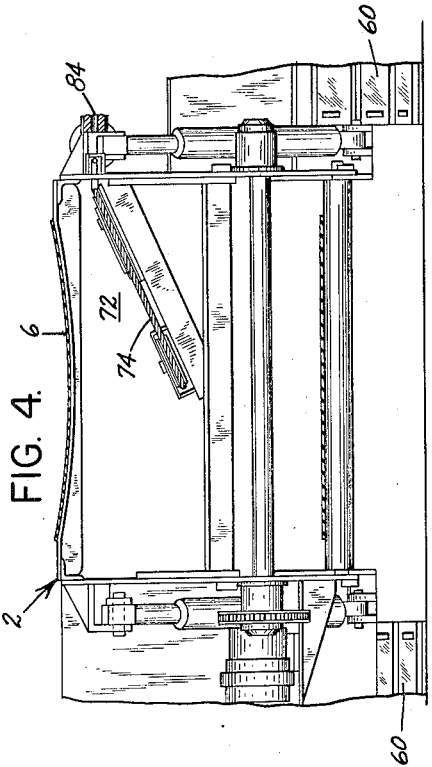
INVENTOR:
HENRY J. YAGGI
BY *John F. Schmidt*
ATTORNEY Nov. 12, 1957     H. J. YAGGI     2,812,848
EXTENSIBLE CONVEYOR
Original Filed May 5, 1953     2 Sheets-Sheet 2
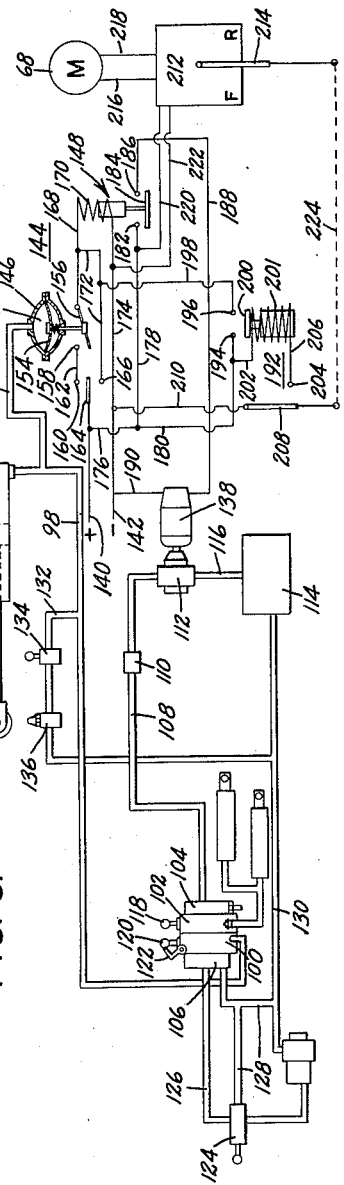
INVENTOR:
HENRY J. YAGGI
BY
John F. Schmidt
ATTORNEY

United States Patent Office 2,812,848
Patented Nov. 12, 1957

2,812,848
EXTENSIBLE CONVEYOR

Henry J. Yaggi, New Philadelphia, Ohio, assignor to Joy Manufacturing Company, Pittsburgh, Pa., a corporation of Pennsylvania Continuation of application Serial No. 353,079, May 5, 1953. This application August 30, 1956, Serial No. 607,197

11 Claims. (Cl. 198—139)

This invention relates to portable extensible belt conveyors, and particularly to conveyors such as are shown in the application of George Baechli, Serial No. 225,791, filed May 11, 1951, and now abandoned, and assigned to the assignee of this invention. The invention disclosed and claimed herein constitutes an improvement of the apparatus disclosed in the said Baechli application identified above.

In apparatus of the type disclosed and claimed in the above-identified Baechli application, it has been found that the conveyor belt may at times be somewhat slow in taking up slack when the take-up buggy is moved toward the drive buggy. It is accordingly an object of this invention to provide a modification of the apparatus disclosed and claimed in the Baechli application identified above, which is an improvement in that the belt take-up apparatus of the conveyor is automatically connected for operation whenever the take-up buggy drive motors are connected to move the take-up buggy toward the drive buggy.

This and other objects are accomplished by means of additional control means for the belt take-up moving means, these additional control means being connected by an interlock with the control means for the take-up buggy traction motors.

In the drawings:

Fig. 1 is a view in elevation of apparatus embodying the invention, this view being a vertical section through a mine to show the apparatus in position to receive mineral from a continuous miner. This figure is substantially identical with Fig. 27 of the above-dientified Baechli application.

Fig. 2 is a longitudinal section through the discharge end of the drive buggy showing the means on the drive buggy to engage and support a conveyor belt and showing the adjustable belt take-up means.

Fig. 3 is a longitudinal section through the mineral receiving end of the take-up buggy, showing the means thereon to engage and support the conveyor belt.

Fig. 4 is a view in section substantially on line 4—4 of Fig. 1.

Fig. 5 is a schematic showing of the two means to engage and support the conveyor belt and of the belt take-up means as connected to be operated by the means to move the take-up means; and Fig. 6 is a schematic view showing the hydraulic circuit for the belt take-up moving means and the control circuit for the motor which drives the pump in said hydraulic circuit.

Referring now in detail to the drawings, it will be understood that only the elements necessary to the operation of the invention of this application will be described in detail herein, and that reference may be had to the aforesaid Baechli application for a more detailed description of the entire apparatus.

Thus, the apparatus comprises a drive buggy 2, a take-up buggy 4, and a conveyor belt 6 carried by the two buggies on belt engaging and supporting means indicated generally at 8 for the drive buggy and at 10 for the take-up buggy.

More specifically, the belt engaging and supporting means 8 on the drive buggy includes a plurality of rotatably mounted belt pulleys 12, 14, 16, 18, 20, 22, 24, 26 and 28, the belt 6 being looped around the several pulleys in a manner which will be understood by those skilled in the art and as more fully explained in said Baechli application. The pulleys 12 and 14 are preferably both power driven and thus supply the power to drive the belt; pulleys 12 and 14 are connected for simultaneous rotation by an conventional gear drive indicated generally at 30 of Fig. 1. The drive means for the pulleys 12 and 14 need not be discussed here, this detail of the apparatus being understandable by reference to the above-identified Baechli application.

Adjustable belt take-up means is provided on one of the buggies. In the embodiment shown in the drawings, the take-up means is mounted on the drive buggy and comprises a belt cluster 32 mounted for longitudinal movement between rails 34 and 36 by means of wheels 38 and 40, the rails 34 and 36 being, in the embodiment shown, secured to the drive buggy frame, and the wheels 38 and 40 being rotatably mounted at opposite ends of a moving carriage 42. Wheels 38 and 40 normally ride on the lower rail 36 and are restrained against upward displacement by the upper rail 34.

The belt cluster 32 carries numerous rotatably mounted belt pulleys 44, 46, 48, 50 and 52, the belt being wrapped around the these pulleys and the pulleys of the belt engaging and supporting means 8 in a manner which will be readily understood by those skilled in the art, and as more fully explained in said Baechli application.

Referring now to the take-up buggy end of the apparatus, the belt engaging and supporting means 10 there shown preferably comprises an end idler pulley 54, a plurality of troughing idlers indicated generally at 56, and a plurality of rolls 58 to support the return run of the belt. It will of course be understood that both buggies are mounted for movement on any suitable ground-engaging means, such as the track-laying devices shown at 60 on the drive buggy and 62 on the take-up buggy.

There is of course a track-laying device 60 at each side of the drive buggy 2 (see Fig. 4), and similarly, a track-laying device 62 at each side of the take-up buggy 4, one of these being shown in Fig. 1 and the other in Fig. 3. The track-laying devices may conveniently be individually driven, as for example by electric motors. One of the drive motors for the track-laying devices of drive buggy 2 is shown at 64 in Fig. 1, being connected with its associated track-laying device through conventional gear reduction and chain drive means indicated generally at 66. A drive motor for one of the track-laying devices 62 of the take-up buggy is shown at 68 in Fig. 1, being connected with its associated track-laying device by suitable conventional gear reduction and chain drive means indicated generally at 70.

Reference was made above to adjustable belt take-up means, this means comprising the belt cluster 32, moving carriage 42, and the rails 34 and 36. Means are provided to move the take-up means in a direction to take up belt slack. In the embodiment shown, the moving carriage 42 is of course moved to the right as seen in Figs. 2 and 5 in order to take up belt slack and to store up extra belting in the event that there is extended movement of the take-up buggy 4 toward the drive buggy 2. To this end, a cable section indicated generally at 72 is connected to the moving carriage 42 in order at all times either to keep the belt 6 in tension or to apply a sufficient force to the moving carriage 42 to take up belt slack as such slack occurs.

More specifically, cable section 72 comprises a cable 74 having a loop 76 engaging the moving carriage 42 at its one end, the other end of cable 74 being secured to a stationary point such as cylinder 78 of a hydraulic cylinder and piston mechanism indicated generally at 80. A plurality, here shown as two, of cable sheaves 82 form part of a multiple (double) block 84. Another multiple (triple) block 86 includes sheaves 88. The multiple block 84 is stationary with respect to the cylinder 78, and to that end may conveniently be secured to one end of the cylinder as shown schematically in Fig. 5. The multiple block 86 is carried by the piston 89 of the cylinder and piston mechanism 80. Other sheaves 90, 92, 94 and 96 serves to guide the cable 74 in its movement into and out of the cable storage system comprising the blocks 84 and 86.

Means are of course provided to supply hydraulic fluid to the cylinder and piston mechanism 80. Mechanism 80 may conveniently be a single-acting hydraulic jack, hydraulic fluid being supplied to extend the jack to apply tension to the cable 74 and through moving carriage 42, to the belt 6, the force to collapse the jack mechanism 80 consisting of relative movement between the buggies 2 and 4 such as to increase the distance between the buggies and therefore to require additional belting which must of course come from the belt storage system. It will of course be understood by those skilled in the art that the jack mechanism 80 will be completely collapsed when the buggies 2 and 4 are separated as far as possible for a given length of belting carried by them, and that the jack mechanism 80 will be fully extended when the buggies 2 and 4 are as close together as possible without slack for a given length of belting.

In order to accomplish the extension of the jack mechanism 80, a hydraulic fluid line 98 is connected to supply fluid to, and vent fluid from, one end of cylinder 78, namely the right end as seen in Figs. 5 and 6. Fluid line 98 is connected with control section 100 of a control valve shown as consisting of two control sections, namely the section 100 referred to and another section 102, a supply section 104, and a discharge section 106. Supply section 104 is connected with one end of a fluid pressure line 108 in which a check valve 110 is provided. The other end of pressure line 108 is connected with the discharge of a hydraulic pump 112. The intake of pump 112 receives fluid from a tank or reservoir 114 by way of a suction line 116.

The hydraulic control valve referred to above and having the control sections 100 and 102 need not be described in detail here, inasmuch as numerous such valves are available in the open market and are well understood by those skilled in the art. It will suffice here to point out that section 102 is provided with a handle 118 and section 100 is provided with a handle 120. So long as handle 118 of section 102 is in its neutral position, hydraulic fluid flows to the section 100, and through it to exhaust until handle 120 is moved out of its neutral position. Inasmuch as the hydraulic cylinder and piston mechanism 80 is a single-acting jack, only one of the discharge outlets of valve section 100 is connected for use, and only one operating position of handle 120 is effective as a "work" position. In the embodiment shown, handle 120 is moved to its "work" position in order to admit fluid under pressure to the fluid line 98. Any suitable mechanism such as the pivoted dog shown schematically at 122 may be used to keep the handle 120 in its effective operating ("work") position. It is shown in this position in Fig. 5.

The entire hydraulic system shown in Fig. 6 need not be described here in detail, as it is sufficiently described in the above-identified Baechli application. It will suffice here to point out that the discharge section 106 is connected with a valve section 124 by means of a fluid line 126. In one operating position of valve section 124, fluid is discharged to fluid line 128, which connects with reservoir 114 by way of a return line 130. Another fluid line 132 connects the line 98 with the return line 130. Fluid line 132 is provided with a cut-off valve 134 and a pressure relief valve 136. With the cut-off valve 134 open, fluid may flow from line 98 to the return line 130 through fluid line 132, providing the pressure is sufficient to force open the pressure relief valve 136.

A suitable drive motor 138 is connected to drive the hydraulic pump 112. In the embodiment shown, motor 138 is indicated schematically as being an electric motor. Any suitable source of electric power is connected to control means to supply power to the electric motor 138. The same power source is likewise connected to suitable control means to supply power to the drive motors 68 for the track-laying devices 62 of the take-up buggy 4. It will be understood that the schematic showing of Fig. 6 indicates one drive motor 68 which represents the traction motor means to drive the take-up buggy. In actual practice, the motor 68 shown schematically in Fig. 6 may be one, two, or any other desired number of motors.

A preferred form of power for mine installations is DC power, here represented as having a positive line 140, and a negative line 142.

Control means for motor 138 are indicated generally at 144 and include a pressure switch 146 and a relay 148. Pressure switch 146 includes a pressure chamber 150 which is always subjected to the pressure in the fluid pressure line 98, being connected therewith by a fluid line 152. A diaphragm 154 in the pressure chamber 150 is connected with a movable contact 156. Movable contact 156 has two operating positions, one of which is shown in Fig. 6. In its other operating position, movable contact 156 engages a fixed contact 158 which is electrically connected with another fixed contact 160 by means of a conductor 162. Another movable contact 164 is movable into either one of two operating positions, in one of which fixed contact 160 is electrically connected with the positive line 140, and in the other of which positive line 140 is connected with a fixed contact 166.

Movable contact 156 is connected by means of a conductor 168 with one end of the operating coil 170 of relay 148. A conductor 172 connects fixed contact 166 with conductor 168. The other end of coil 170 is connected with the negative line 142 by means of a conductor 174.

A branch conductor 176 is connected at its one end with positive line 140, and at its other end divides into two branches 178 and 180. Branch 178 is connected with a stationary contact 182 of relay 148. Relay 148 carries a movable contact 184 which is adapted to complete a circuit between said stationary contact 182 and another stationary contact 186. Contact 186 has connected to it one end of a conductor 188, the other end of which is connected with motor 138. A conductor 190 connects motor 138 with the negative line 142.

Additional control means for the motor 138 are provided and include a relay 192. Relay 192 is provided in order to bypass the pressure switch 146, and toward that end includes one stationary contact 194 connected to the conductor 180 referred to above, and another stationary contact 196 connected to the conductor 172 referred to above by a conductor 198. A movable contact 200 of relay 192 is adapted to complete a circuit between contacts 194 and 196.

One end of the operating coil 201 of relay 192 is connected with conductor 180 by a conductor 202, and the other end of the coil 201 is connected to a stationary contact 204 by means of a conductor 206. A movable contact 208 is connected with negative line 142 by means of a conductor 210, and is adapted in its closed position to engage stationary contact 204.

Control means are provided for the traction motor means, these control means including a conventional motor controller 212 having an operating handle 214 movable into forward and reverse positions indicated by the letters F and R respectively. It is assumed that the reverse operating position for controller 212 connects motor 68 to move the take-up buggy toward the drive buggy.

Controller 212 is connected with the take-up buggy traction motor means, shown schematically in Fig. 6 as a single motor 68, by means of conductors 216 and 218. Controller 212 is connected with the power supply by means of conductors 220 and 222; conductor 220 is connected to the positive line by way of conductors 178 and 176, while conductor 222 is connected to the negative line by means of conductor 174.

An interlock is provided connecting the traction motor control means with the additional control means for the belt take-up moving means. This interlock may be any conventional mechanical interlock, and is shown schematically by the dotted line 224 connecting the movable contact 208 with the motor controller handle 214 in such a manner that movement of the controller handle to connect traction motor means 68 in reverse at the same time moves contact 208 into engagement with contact 204.

Operation

If movable contact 164 is engaged with fixed contact 166, drive motor 138 for pump 112 is connected for constant operation of the pump. It will therefore be assumed, for a description of the operation of this invention, that the movable contact 164 is engaged with the fixed contact 160. Under these conditions, drive motor 138 will not be supplied with power unless the pressure switch 146 is closed, or unless the additional control means 192 be operated.

It will be assumed that the pressure in pressure switch 146 has not dropped sufficiently to move contact 156 into engagement with contact 158. Let it now be assumed that the motor controller 212 is moved into its reverse position, namely connecting the take-up buggy traction motor means 68 for movement of the take-up buggy toward the drive buggy.

With handle 214 moved to the right as seen in Fig. 6, interlock 224 simultaneously moves the movable contact 208 into engagement with the fixed contact 204. There is then a circuit established for the coil 201 as follows: positive line 140, conductors 176, 180 and 202, coil 201, conductor 206, fixed contact 204, movable contact 208, and conductors 210 and 174 to negative line 142.

With coil 201 energized, movable contact 200 moves into engagement with fixed contacts 194 and 196, and establishes the following circuit for coil 170 of relay 148: positive line 140, conductors 176 and 180, fixed contact 194, movable contact 200, fixed contact 196, conductors 198, 172 and 168, coil 170 and conductor 174 to the negative line 142.

With coil 170 energized, a circuit for motor 138 is established as follows: positive line 140, conductors 176 and 178, fixed contact 182, movable contact 184, fixed contact 186, conductor 188, motor 138 and conductor 190 to negative line 142.

With motor 138 in operation, pump 112 is pumping fluid under pressure to the jack mechanism 80 by way of pressure line 108, valve section 100, and pressure line 98. Fluid is thereupon supplied to the cylinder 78 of the jack mechanism, and when slack exists in the belt 6 the jack is extended and moves the multiple blocks 84 and 86 apart to put a tension in the cable 74 which is sufficient to move the moving carriage 42 to the right as seen in Figs. 2 and 5. As the carriage 42 thus moves to the right, it takes up the slack in the belt 6 which is provided by movement of take-up buggy 4 toward the drive buggy.

It will be evident that movement of controller handle 214 into the forward position has no effect on the hydraulic pump drive motor 138, because such movement, as schematically shown in Fig. 6, merely moves the contact 208 further away from contact 204.

From the foregoing it will be apparent to those skilled in the art that this invention provides a positive means for insuring operation of the hydraulic pump whenever the traction motor means of the take-up buggy is connected to move the take-up buggy toward the drive buggy. Other advantages will be apparent to those skilled in the art.

It will further be noted that the drive and take-up buggies constitute and/or include a conveyor drive, a take-up unit and adjustable take-up (and storage) means or, otherwise expressed, a pair of supports—mobile or movable supports—and an associated take-up means, said supports being relatively translatorily movable.

This application is a continuation of application Serial No. 353,079, filed May 5, 1953, and now abandoned.

While there is in this application specifically described one form which the invention may assume in practice, it will be understood that this form of the same is shown for purposes of illustration and that the invention may be modified and embodied in various other forms without departing from its spirit or the scope of the appended claims.

What is claimed is:

1. An extensible conveyor comprising a conveyor drive including means for engaging and supporting a flexible conveyor, a take-up unit, means on the take-up unit for engaging and supporting a flexible conveyor, adjustable conveyor take-up and storage means, a flexible conveyor carried by said two flexible conveyor engaging and supporting means and in engagement with said adjustable conveyor take-up and storage means, means to actuate the adjustable conveyor take-up and storage means in a direction to take up conveyor slack, motor means to effect movement of the take-up unit alternatively in a direction towards and away from the conveyor drive, control means for the adjustable conveyor take-up and storage means actuating means, control means for said motor means, additional control means for the adjustable conveyor take-up and storage means actuating means, and an interlock connecting the two last-named control means whereby said additional control means is engaged whenever said motor control means is engaged for movement of the take-up unit toward the conveyor drive.

2. An extensible conveyor comprising a conveyor drive including means to engage and support a flexible conveyor, a take-up unit, means on the take-up unit to engage and support a flexible conveyor, adjustable conveyor take-up means between said drive and said take-up unit, a flexible conveyor carried by the two flexible conveyor engaging and supporting means and in engagement with the conveyor take-up means, means to move the take-up means in a direction to take up conveyor slack, said moving means including a motor, motor means to move the take-up unit alternatively in a direction toward the conveyor drive and away from the conveyor drive, means to start and stop said motor, control means for said motor means, additional means to start and stop said motor, and an interlock connecting the control means and the additional means whereby the additional means is actuated to motor starting position whenever the control means is engaged for movement of the take-up unit toward the conveyor drive.

3. A conveyor as in claim 2, in which the additional means includes a relay and a control circuit for the relay, the control circuit connected to be opened and closed by actuation of the motor control means to actuate said interlock.

4. An extensible conveyor comprising a pair of mobile supports each having means for engaging and supporting a flexible conveyor and one having associated with it take-up means for a flexible conveyor, a flexible conveyor carried by the flexible conveyor engaging and supporting means and engaging the take-up means, power means for operating the take-up means to effect flexible conveyor take-up, means for effecting translatory relative movement between said mobile supports having control means for effecting movement of approach between the mobile supports, and means controlled by said control means when it is so operated for energizing the power means to effect flexible conveyor take-up.

5. A belt conveyor comprising a pair of supports each having means for engaging and supporting a conveyor belt, at least one of said supports being mobile and one of said supports having associated with it take-up means for a conveyor belt, a conveyor belt carried by the belt engaging and supporting means of each of said supports and engaging the take-up means, power means for operating the take-up means to effect conveyor belt take-up, means for effecting translatory relative movement between said supports having control means for effecting movement of approach of one of said supports relative to the other, and means controlled by said control means whenever it is so operated for energizing, if it is not already energized, said power means to effect belt take-up.

6. A belt conveyor comprising a pair of supports each having means for engaging and supporting a conveyor belt and one having associated with it take-up means for a conveyor belt, the take-up means including a hydraulic motor operative on fluid supply thereto to effect operation of the take-up means, a continuous conveyor belt carried by said belt engaging and supporting means and engaging the take-up means, means for supplying fluid to said hydraulic motor means for effecting translatory movement between said movable supports and having control means therefor for effecting movement of approach between the supports, and means controlled by said control means for effecting fluid supply by the fluid supplying means to the hydraulic motor, if such fluid supply is not then already occurring, whenever said control means is operated to effect such movement of approach.

7. A belt conveyor comprising a pair of supports each having means for engaging and supporting a conveyor belt and one having take-up means for a conveyor belt, the take-up means including a hydraulic cylinder and piston mechanism operative on fluid supply thereto to effect operation of the take-up means, a continuous conveyor belt carried by the belt engaging and supporting means and engaging the take-up means, means for supplying fluid to the cylinder and piston mechanism, means having control means therefor for effecting movement of approach between the supports, means controlled by the pressure in the cylinder and piston mechanism for effecting automatic supply of fluid from the fluid supplying means to the cylinder and piston mechanism when the pressure in the latter is below a predetermined value, and means controlled by said control means for effecting fluid supply by the fluid supplying means to the cylinder and piston means, if it is not then so supplying fluid, whenever said control means is operated to effect such movement of approach.

8. A belt conveyor comprising a pair of movable supports each having means for engaging and supporting a conveyor belt and one having associated with it take-up means for a conveyor belt, a conveyor belt carried by the belt engaging and supporting means and engaging the take-up means, hydraulically operated means for operating the take-up means to effect conveyor belt take-up, means operable to supply fluid under pressure to the hydraulically operated means, means for effecting translatory movement between said movable supports having control means operable to effect movement of approach between said movable supports, and means controlled by said control means whenever it is so operated, to operate the fluid supply means to effect belt take-up, if it is not then so doing.

9. A belt conveyor comprising a pair of relatively translatorily movable supports each having means for engaging and supporting a conveyor belt and one having associated therewith take-up means for a conveyor belt, the take-up means including a hydraulic cylinder and piston mechanism operative on fluid supply thereto to effect operation of the take-up means, means including a motor to supply fluid under pressure to said hydraulic mechanism, a continuous conveyor belt carried by the belt engaging and supporting means and engaging the take-up means, means having control means therefor for effecting movement of approach between the supports, and means controlled by said control means to effect starting of the motor, if it is not then running, whenever said control means is operated to effect movement of approach between the supports.

10. A belt conveyor comprising a pair of supports each having means to engage and support a conveyor belt and one having take-up means for a conveyor belt, the take-up means including a hydraulic system operative on fluid supply thereto to effect operation of the take-up means, means including a pump to supply fluid under pressure to the hydraulic system, a continuous conveyor belt carried by the belt engaging and supporting means and engaging the take-up means, support moving means having control means therefor for effecting movement of approach between the pair of supports, and means controlled by the said control means to operate the pump, if it is not then operating, whenever the control means is operated to effect movement of approach between the supports.

11. An extensible conveyor comprising a pair of relatively movable supports each having means for engaging and supporting an endless flexible conveyor, take-up means for an endless flexible conveyor, an endless flexible conveyor carried by the flexible conveyor engaging and supporting means and engaging the take-up means, power means for operating the take-up means to effect flexible conveyor take-up, means for effecting translatory relative movement between said supports having control means for effecting movement of approach between said supports, and means automatically operative during movement of approach between said supports for supplying energy to said power means, if it is not then already energized, to effect flexible conveyor take-up.

No references cited.